June 24, 1930.  S. B. STINE  1,767,563
APPARATUS FOR MOLDING CASTINGS
Filed May 31, 1929  2 Sheets-Sheet 2
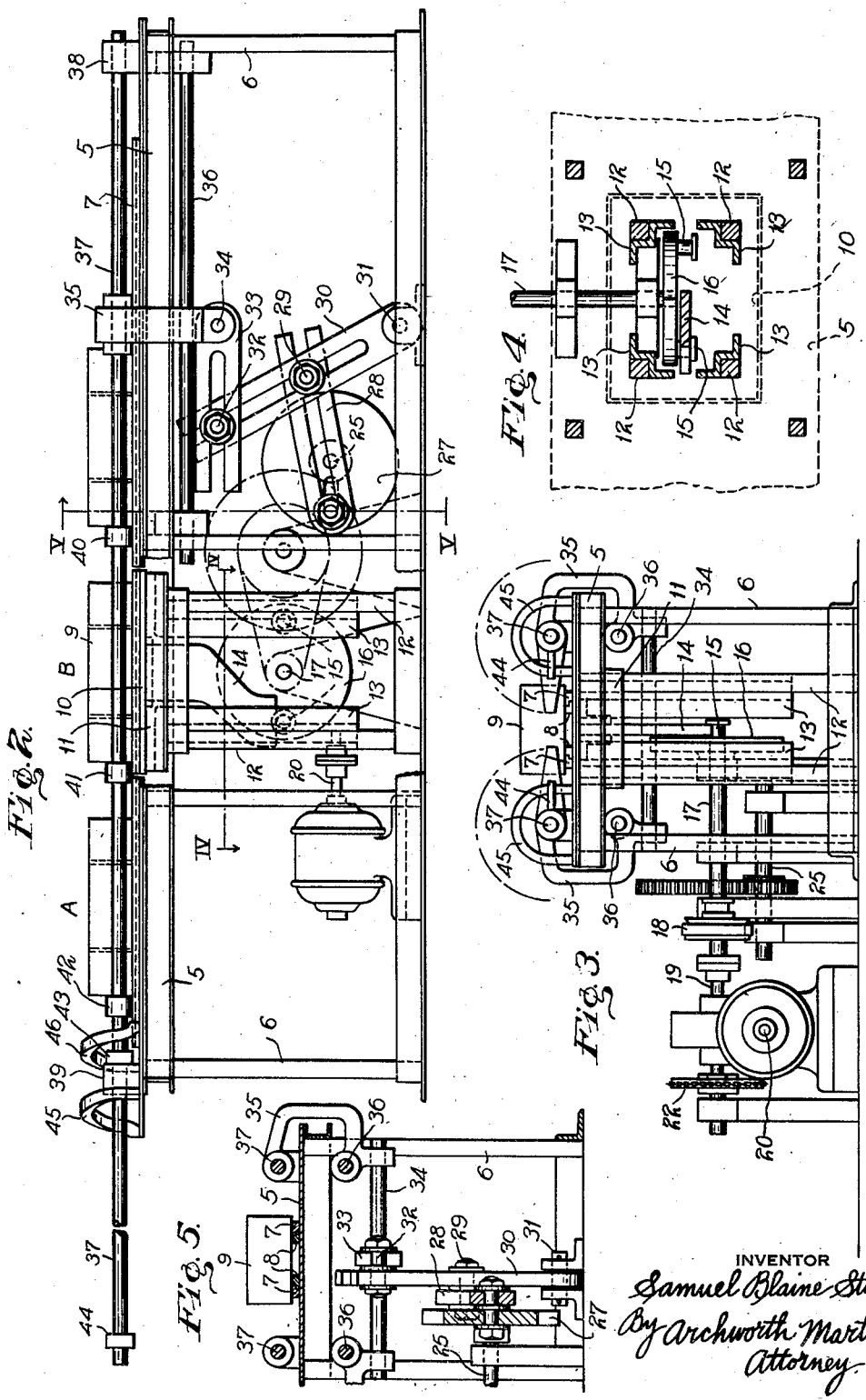

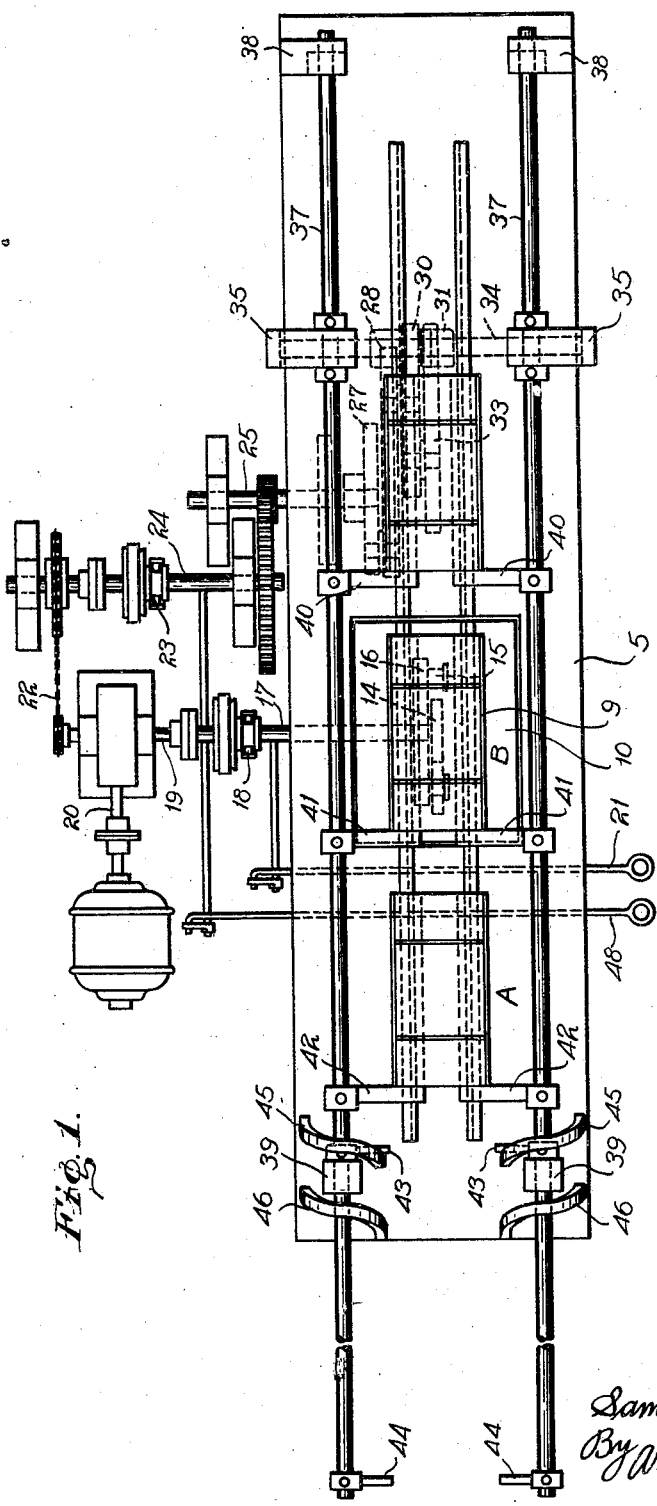

Patented June 24, 1930

1,767,563

UNITED STATES PATENT OFFICE

SAMUEL BLAINE STINE, OF OSCEOLA MILLS, PENNSYLVANIA

APPARATUS FOR MOLDING CASTINGS

Application filed May 31, 1929. Serial No. 367,210.

My invention relates to a method of and apparatus for molding metal casting and plastic materials, and involves the vibration or jolt ramming of molds to either compact molding sand around patterns contained in the molds, or to compact shale, clay, silica, etc., in mold cavities during the formation of bricks, hollow tile, etc.

One object of my invention is to provide a means and a method of generally simplified and improved form for handling molds.

Another object of my invention is to provide an improved means for handling molds.

One form which my invention may take is shown in the accompanying drawing, wherein Figure 1 is a plan view of the apparatus for practicing the invention; Fig. 2 is a side elevational view thereof; Fig. 3 is an end view looking from the left hand end of Figs. 1 and 2; Fig. 4 is a view taken on the line IV—IV of Fig. 2, and Fig. 5 is a view taken on the line V—V of Fig. 2.

Briefly stated, my invention comprises the placing of molds upon a table along which they may be advanced to a jarring station and thereafter advanced to an unloading station, the molds being advanced from station to station by intermittent movements and one mold being advanced from the loading station to the jarring station simultaneously with advance movement of a preceding mold from the jarring station to the unloading station.

The apparatus includes means whereby the advance movements of the molds are effected by reciprocable mechanism of simple form such as pusher arms that are mounted on pull rods that may be reciprocated for predetermined variable distances, depending upon the lengths of the molds being handled.

The table as a whole is indicated by the reference numeral 5 and is mounted upon suitable framework 6. The table 5 is provided with guide rails 7 that are undercut as shown more clearly in Figs. 3 and 5, so that guide bars 8 secured to the undersides of molds 9 may have interfitting engagement therewith and the molds held against lateral and vertical movements, although such molds are slidable longitudinally of the tables, as hereinafter explained. The table 5 has a jarring or jolt ramming section 10 that is also provided with guide rails similar to and forming continuations of the guide rails 7. The jarring table 10 is vertically movable by the jolt ramming mechanism as hereinafter explained.

The table 10 is normally supported upon an anvil 11 that is in turn supported by posts 12. The table 10 is provided with guide rails or posts 13 that extend downwardly through the anvil and have sliding engagement with the posts 12, so that the table is guided in its vertical movements. The table is also provided with a downwardly-extending arm 14. The arm 14 is positioned to be intermittently engaged by crank pins 15 which are carried by a crank disc 16, so that during each revolution of the crank disc, the table 10 is elevated twice by engagement of the crank pins with the lower end of the arm 14, the table of course falling each time that one of the crank pins passes out of engagement with the arm 14, thus imparting a jarring action to the sand, clay, or the like, which may be contained within the mold.

The crank disc 16 is mounted on a shaft 17 that has connection through a clutch 18 with a driving shaft 19 that is driven from a motor shaft 20. The clutch 18 is controlled by suitable means such as a lever 21.

The shaft 20 also has driving connection, through a sprocket chain 22 and a clutch 23, with a shaft 24. The shaft 24 has gear and pinion connection with a shaft 25 which carries a crank member 27 that drives a crank arm 28. The crank arm 28 has pivotal connection through a pin or bolt 29 with a rocking lever 30. The rocking lever 30 is pivoted at 31 to the base of the machine and the bolt 29 is adjustable longitudinally of the lever, so that the length of throw of the upper end of the lever during each revolution of the shaft 25 can be varied.

The upper end of the lever 30 has sliding engagement with a pin or bar 32 which is adjustably connected to a bar 33, so that as the lever 30 is oscillated about its pivot 31, the bar 33 will be reciprocated horizontally beneath the table 5. The bar 33 is connected to a rod 34 that carries at its ends brackets 35 that are slidably supported upon guide rods 36. The upper ends of the brackets 35 are adjustably connected to pull rods 37 that are slidably supported in bearing blocks 38 and 39 at the front and rear ends of the table respectively.

The pull rods 37 carry pairs of pusher arms 40, 41 and 42 that are adjustably secured thereto, so that when the said rods are oscillated, the pusher arms will rock with the rods.

The pull rods 37 also carry camming pins 43 and 44 that co-operate with cams 45 and 46 respectively to effect rocking movements of the rods 37 and the pusher arms at the forward and rearward limits of longitudinal movement of the rods under the action of the crank 27.

The operation of the apparatus is as follows:—A mold will be placed upon the table, at the loading station A whereupon an operating link or lever 48 will be moved to actuate the clutch 23 so as to effect driving connection between the shafts 20 and 24. The crank 27 will then be rotated to effect forward movement of the pull rods 37 and consequently of the mold from station A. The adjustment of the bar 28 with respect to the lever 30 is such that the throw of the lever will be sufficient to advance the mold from station A to jarring station B. The clutch 23 will then be disengaged, thereupon the clutch 18 will be actuated to set the shaft 17 and its cam disc 16 in motion to effect jarring of the table section 10. During this time, another mold will be placed upon the table at station A.

At the end of a forward movement of the rods 36, the pins 44 will engage cam surfaces 46 to rotate such rods and swing the inner ends of the pusher arms 40, 41 and 43 upwardly to a substantially vertical position so that upon retractive movement of the lever 30 and of the rods 37, the arms will clear molds which may be present at stations A and B, for instance.

Upon retractive movement of the pull rods 37, the pins 43 will engage the cam surfaces 45 to effect rocking movement of the rods 37 and the pusher arms to the positions shown in Fig. 1. A mold-jarring operation at the station B having been completed and another mold having been placed upon the table at loading station A, advancing movement of the pull rods 37 will advance all of the molds, the mold which was previously jarred being thereby advanced to a point near the front of the table from where it can be removed by a workman or a crane, and the mold from station A being advanced to station B in position for jolting.

The use of the guide rails 7 on the table and the guide bars 8 on the mold, that have interlocking relation, avoids the necessity of special clamping devices for holding the mold firmly upon the jarring table during vibration thereof. The arrangement shown serves not only to guide the mold into centralized position upon the table, but also holds it firmly thereon during vertical jarring movements. The positioning of the mold over the central point of the jarring table also avoids binding of the vertical guide members of the jarring table.

I claim as my invention:—

1. Mold handling apparatus comprising a table, a pull rod, a pusher pin carried by said rod for advancing molds during advance movements of the rod, a second pin carried by the rod, a cam positioned to be engaged by said second pin and cause rotative movement to said rod to turn the pusher pin to inoperative position at the completion of an advance movement of the rod, and a cam positioned to be engaged by the first-named pin, for restoring said pin to operative position at the completion of retractive movement of said rod.

2. Molding apparatus comprising a mold-supporting table, a jarring table located intermediate the ends of the supporting table, driving mechanism, and a reciprocable member actuated by said mechanism and having connection with molds on said table to intermittently advance the same, the said reciprocable member having adjustable connection with the mechanism to regulate the length of reciprocatory travel.

3. Mold apparatus comprising a mold table, driving mechanism, means movable into and out of operative relation with respect to said mechanism for intermittently advancing the molds, a jarring table located intermediate the ends of the first-named table, and means having detachable connection with said driving mechanism for actuating said jarring table.

4. Molding apparatus comprising a table, a pull rod, a plurality of pusher pins carried by the rod and spaced longitudinally thereof for advancing molds during advance movements of the rod, a pin carried by the rod adjacent to one end thereof, a cam positioned to be engaged by the second-named pin and cause rotative movement of the rod to turn the pusher device to inoperative position at the completion of the advance movement of the rod, and a cam positioned to be engaged by one of the first-named pins for restoring said pins to operative position at the completion of retractive movement of said rod.

5. Molding apparatus comprising a table across which molds may be advanced, a longitudinally movable pull rod mounted for oscillatory movement, mold-engaging members carried by said rod in position to engage molds when the rod is in one rotative position and which are out of engagement with the molds when the rod is in another rotative position, a stationary camming member and a camming surface on said rod positioned to engage said surface to effect rotative movement of the rod when the rod approaches one extreme position of longitudinal movement.

In testimony whereof I, the said Samuel Blaine Stine have hereunto set my hand.

SAMUEL BLAINE STINE.